United States Patent [19]
Blair et al.

[11] Patent Number: 5,276,754
[45] Date of Patent: Jan. 4, 1994

[54] OPTOELECTRONIC MOUNT AND METHOD FOR MAKING

[75] Inventors: Thomas H. Blair, Lake In The Hills, Ill.; Davis H. Hartman, Phoenix; Michael S. Lebby, Chandler, both of Ariz.

[73] Assignee: Motorola, Inc., Schaumburg, Ill.

[21] Appl. No.: 909,507

[22] Filed: Jul. 6, 1992

[51] Int. Cl.⁵ .............................. G02B 6/42
[52] U.S. Cl. ...................... 385/88; 385/89; 385/90; 385/91; 385/92
[58] Field of Search ............. 385/88, 89, 90, 91, 385/92

[56] References Cited

U.S. PATENT DOCUMENTS

| | | | |
|---|---|---|---|
| 4,357,072 | 11/1982 | Goodfellow et al. | 385/91 |
| 4,549,783 | 10/1985 | Schmachtenberg, III | 385/88 |
| 4,728,787 | 3/1988 | Henry et al. | 385/91 |
| 4,730,198 | 3/1988 | Brown et al. | 385/91 |
| 4,798,439 | 1/1989 | Preston | 385/91 |
| 5,119,451 | 6/1992 | Wills et al. | 385/14 |

*Primary Examiner*—Frank Gonzalez
*Attorney, Agent, or Firm*—Gary F. Witting

[57] ABSTRACT

An optical device (112, 212, 312) with first (118) and second contacts (119, 219, 319), a molded waveguide (101,201) with first (115) and second metal tracks (117) and electrical couplings from contact (118) to the first metal track (115, 315) and from the second contact (119, 219) to the second metal track (117, 217, 317) by reflowing first and second bump balls (126) positioned between the first (118) and second (119) contacts and the first (115) and second (117) metal tracks, respectively.

27 Claims, 2 Drawing Sheets

OPTOELECTRONIC MOUNT AND METHOD FOR MAKING

BACKGROUND OF THE INVENTION

This invention relates, in general, to fabrication of optical devices and, more particularly, to interconnecting optical devices and waveguides together.

This application is related to copending application that bearing attorneys docket number CRO7823 and Ser. No. 07/889,335, titled MOLDED WAVEGUIDE AND METHOD OF MAKING SAME, filed on May 1, 1992 which is hereby incorporated by reference herein.

At present, interconnection of an optical device and a waveguide is a difficult task which typically is achieved by use of hand methods or use of semiautomatic methods for interconnection or mating of the waveguide and the optical device. Generally, these methods are complex, inefficient, and not suitable for high volume manufacturing. However, a major problem associated with interconnection of optical devices to waveguides is a fabrication method and structure which will allow electrical and mechanical coupling between the optical device and the waveguide.

In the prior art, interconnection of the optical device and the waveguide typically is achieved by carefully aligning the optical device to the waveguide by hand, commonly called active alignment, and subsequently cementing or adhering the optical device to the waveguide. However, many problems arise by aligning the optical device and the waveguide by hand, such as being extremely labor intensive, costly, inaccuracy of alignment, and the like. Further, curing of the adhesive which binds the optical device and the waveguide together often results in a shifting of the alignment of the optical device to the waveguide, thus causing a potential inefficient transfer of light from the optical device. Moreover, if the misalignment is severe enough, unusable product is manufactured, thus increasing cost and reducing manufacture capability.

It can be readily seen that conventional methods for connecting an optical device to a waveguide have severe limitations. Also, it is evident that the conventional processes that are used to fabricate the interconnection between the optical device and the waveguide are not only complex and expensive, but also not effective processes. Therefore, a method for making an interconnection between an optical device and a waveguide would be highly desirable.

SUMMARY OF THE INVENTION

Briefly stated, a method for electrically coupling an optical device to a waveguide is provided. An optical device having a first contact and a second contact is provided. A molded waveguide with a first metal track on a first surface, a second metal track on a second surface, and an end is provided. An electrical coupling is created from the first contact of the optical device to the first metal track of the molded waveguide and from the second contact of the optical device to the second metal track of the molded waveguide by reflowing a first and second bump ball positioned between the first and second contact and the first and second metal track, respectively.

Also, an optoelectronic mount is described, whereby an optical device is electrically and mechanically coupled to a waveguide.

DETAILED DESCRIPTION OF THE DRAWINGS

Figure 1:
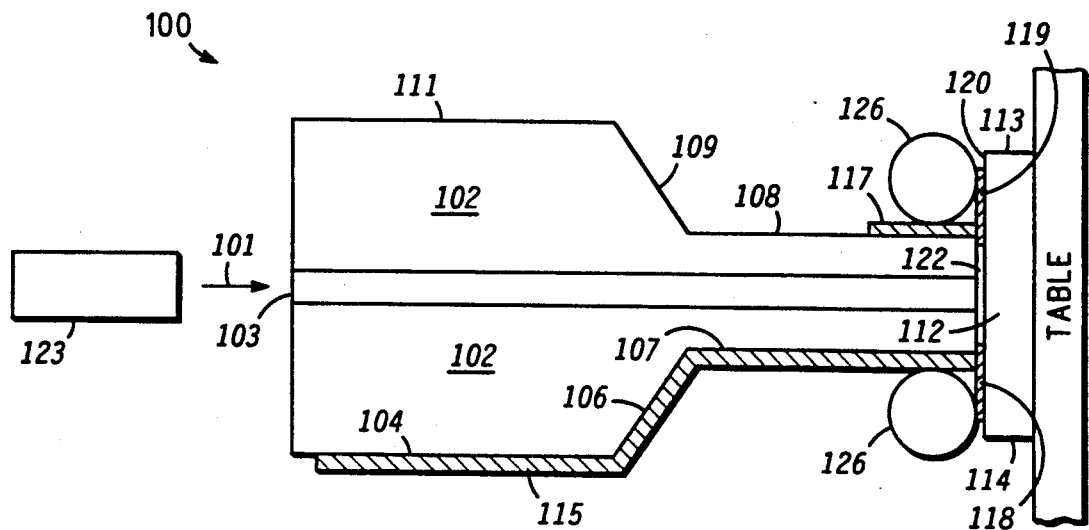
FIG. 1 is a simplified cross-sectional view of a waveguide fit-ted to an optical device.

FIG. 1 is an enlarged simplified cross-sectional view of a waveguide 101 being fitted to an optical device 112. It should be understood that FIG. 1 is a partially completed optoelectronic mount 100 that is cross-sectioned. In the present invention, a combination of processes is described that allows for accurate and efficient electrical and mechanical coupling or interconnection of waveguide 101 and optical device 112, thus making optoelectronic mount 100.

Generally, waveguide 101 is fabricated with a plurality of core regions 103 that are surrounded by cladding regions 102. Typically, both core regions 103 and cladding regions 102 are made of a hard optically transparent polymer, wherein core regions 103 have a higher refractive index than do cladding regions 102, thus allowing for efficient light transmission through core region 103. Typically, there is a refractive index difference of at least 0.01 between core region 103 and cladding regions 102. In a preferred embodiment of the present invention, waveguide 101 is made in accordance with copending application previously mentioned hereinabove. Further, waveguide 101 is made in such a manner that surfaces 104 and 111 create a first width that is wider than surfaces 114 and 113 of optical device 112. However, it should be understood by one of ordinary skill in the art that surface 108 could be extended across waveguide 101, thus eliminating surfaces 109 and 111.

Conductive layer or track 115 is made by a number of well-known methods in the semiconductor art. Typically, conductive layer or tab 115 is made of a metal material or alloy material, such as aluminum, copper, or the like. These materials are deposited on surfaces 104, 106, and 107 by a variety of means, such as evaporation, sputtering, or the like. Typically, conductive layer or track 115 extends across and from surfaces 104, 106, and 107 of waveguide 101, thereby providing a large conductive surface.

Track 117 also is made by several well-known processes in the semiconductor art. Typically, a conductive material or alloy, such as aluminum or copper is deposited on surfaces 108, 109 and 111. Well-known photolithography and etch processes are used to define tab or track 117 and transfer defined track 117 into the deposited conductive material. Briefly, a photoactive polymer is applied to the conductive material. A pattern, which defines track 117, is generated by exposing the photoactive polymer to light by any number of methods, such as photoprojection, direct write, or the like. Once the photoactive polymer has been exposed, the pattern is developed, thereby leaving portions of the conductive material masked by islands of polymer and areas that are not masked exposed. A subsequent etching process is used to transfer the pattern that defines track 117 into the conductive material by etching away the exposed areas of the conductive layer. Removal of the remaining photoactive polymer after etching typically is achieved by several well-known methods in the art, such as wet solvent treatments, dry plasma treatments, or the like.

Generally, optical device 112 is either an optical transmitter or an optical receiver; however, when optical device 112 is an array, optical receivers and optical transmitters may be combined in the same optical device 112. For example, when optical device 112 is an optical transmitter, optical device 112 may be a laser, a laser die, a light emitting diode, or the like. Alternatively, when optical device 112 is an optical receiver, optical device 112 may be a photoreceiver, a photodetector, a phototransistor, or the like. Additionally, optical device 112 is made in such a manner that a first contact 118 and a second contact 119 are elevated above surface 120 of optical detector 112. Methods for making elevated contacts 118 and 119 are well known in the semiconductor packaging art. Typically, elevated contacts 118 and 119 are made by a series of electroless plating procedures which deposit metal layers of various thicknesses and compositions onto a preexisting metal contact that is fabricated during manufacture of optical device 112.

It should be understood by one of ordinary skill in the art that optical device 112 and waveguide 101 are manufactured separately and are brought together to fabricate optoelectronic mount 100.

In the present invention, optoelectronic mount 100 is assembled using a robotic arm 123. Robotic arm 123 is illustrated as a simple rectangular box due to a variety of tools which can be used by robotic arm 123. Further, while only one robotic arm 123 is shown, it should be understood that a number of robotic arms (not shown) could be used to assist in manufacturing optoelectronic mount 100. Additionally, it should be further understood that robotic arm 123 can be facilitated in movement by using a machine vision system or systems which are commonly available in the industry. In a preferred embodiment of the present invention, robotic arm 123 moves to a location of prefabricated waveguides 101 (not shown). Robotic arm 123 selects and picks up an available waveguide 101 and moves waveguide 101 to an awaiting prefabricated optical device 112 which is positioned in a jig (not shown) which is supported on a table. Robotic arm 123 then places waveguide 101 on optical device 112 so that track 115 is aligned with contact 118 and track 117 is aligned with contact 120.

Positioning alignment of waveguide 101 by robotic arm 123 in relation to optical device 112 typically is achieved by using machine vision techniques which are commonly used in automated manufacturing. However, it should be noted that alignment of waveguide 101 to optical device 112 commonly is held to within plus or minus two microns in all axes (e.g., horizontal (x), vertical (y), and plane (z) axes), thus making alignment of optical device 112 and waveguide 101 accurate and repeatable. However, it should be noted that future systems will provide a greater accuracy of placement, thereby providing enhanced alignment of waveguide 101 to optical device 112, as well as improved repeatability. Additionally, by making a working portion (not shown) of optical device 112 approximately one micron to ten microns in diameter and by making core region 103 approximately fifty microns by fifty microns, alignment of the working portion of optical device 112 to core region 103 is effectively and reliably aligned by robotic arm 123, thereby allowing a highly reliable alignment and manufacturable process for making optoelectronic mount 100. Further, it should be noted that contacts 118 and 119 act as mechanical detentes or stops for waveguide 101 so as not to mechanically crush the working portion of optical device 112. However, it should be understood that other methods are possible that would not physically damage the working portion of optical device 112, such as recessing the working portion of optical device 112 or manufacturing a cavity (not shown) in an end of waveguide 101 where waveguide 101 and optical device are joined.

However, when a cavity 122 is formed between waveguide 101 and optical device 112, light signals either coming from optical device and into core 103 or coming from core 103 and into optical device are transferred by either filling cavity 122 with an optically transparent polymer which has a similar refractive index to core 103 or by leaving cavity 122 open or unfilled. However, filling of cavity 122 with an optically transparent polymer provides several advantages, such as preventing contamination in cavity 122 and preventing intrusion of a molding compound into cavity 122 during over molding process in which optoelectronic mount 100 is over molded to form a completed package.

While robotic arm 123 holds waveguide 101 in place, an extension of robotic arm 123 or another robotic arm (not shown) places solder members 126 between contacts 118 and 119 and track 117 and conductive track 115, respectively. Generally, solder members 126 are attached and held in place to contacts 118 and 119 and track 117 and conductive track 115, respectively by means of sonically welding solder members. Additionally, it should be understood by one skilled in the art that solder members 126 could include a variety of soldering materials, such as bump balls, solder paste, low temperature melting metals, or gold.

In a preferred embodiment of the present invention, solder members 126 are bump balls. Bump balls typically are manufactured by atomizing liquid solder to form spherical shaped balls of solder. Chemical composition and size of bump balls vary greatly depending upon specific application and use. Additionally, bump balls are commercially available from a large number of vendors one of which is ALPHA METALS INC. located in Jersey City, New Jersey.

Figure 2:
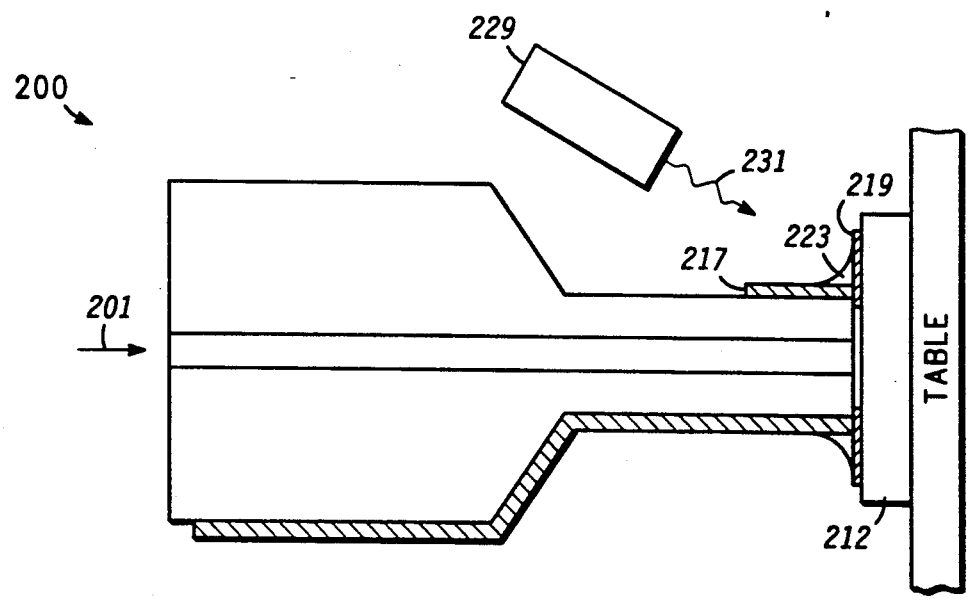
FIG. 2 is a simplified cross-sectional view of a waveguide affixed to an optical device.
Figure 3:
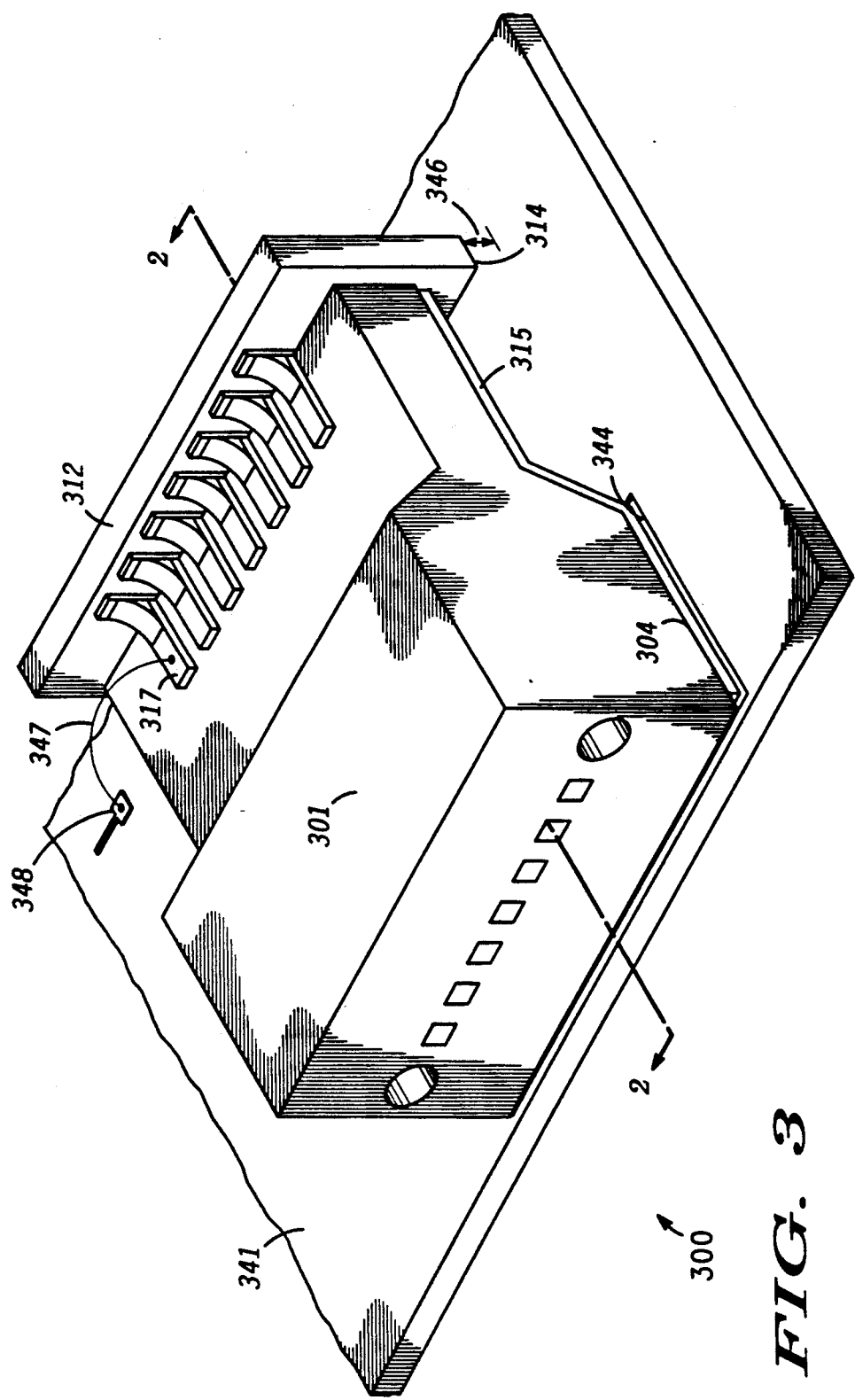
FIG. 3 is a simplified perspective view of an optical mount attached to an interconnect board.

FIG. 2 is an enlarged simplified cross-sectional view of waveguide 201 affixed to optical device 212 as shown in FIG. 3 by arrows 2—2. Similar features discussed previously in FIG. 1 have the same numerical identity except that a numeral 2 has replaced the numeral 1. In a preferred embodiment of the present invention, laser 229 is shown emitting light, represented by curved line 231, between track 217 and contact 219, thus heating solder members 126 which melts solder members 126 as shown in FIG. 1 to form reflowed solder joint or solder fillet 233. However, other methods for thermally heating solder members 126 depending upon specific application, such as acoustic heating or convection heating. It should be understood by one of ordinary skill in the art that solder flux (not shown) is used at times to enhance wetting of surfaces, thus providing a better solder joint. Reflowed solder joint 233 effectively binds or joins waveguide 201 and optical device 212 together both electrically and mechanically, thereby allowing optoelectronic mount 200 to be moved without damaging either waveguide 201 or optical device 212. Further, it should be understood that laser 229 typically is controlled by robotic methods well known in the art, thus accurately being able to place laser 229 so as to form solder joint or solder fillet 233.

FIG. 3 is an enlarged simplified perspective view of an optoelectronic mount 300 placed on an interconnect board 341. It should be noted that similar features discussed previously in FIG. 1 and FIG. 2 have the same numerical identity except that a numeral three has replaced the numeral one or two. As is shown in FIG. 3, optoelectronic mount 300 is placed onto interconnect board 341 by mating conductive tract 315 on surface 304 to ground contact 344. Typically, mating of conductive tract 315 to contact 344 is achieved by a number of suitable means, such as electrically conductive epoxy, electrically conductive polyimide, solder, gold, or the like. Additionally, it should be noted that by providing a large ground contact as is shown in the present invention an additional benefit of heat sinking or removing heat from array 312 is achieved. Further, by having surface 304 extend beyond surface 314 a gap 346 is provided between array 312 and top surface of interconnect board 341, thereby protecting array 312 from mechanical damage.

Interconnection between individual optical devices in array 312 and interconnect board 341 with semiconductor devices is achieved by wire bond 347. Typically, a wire bond 347 is made between a bonding pad 348 located on interconnect board 341 and track 317 located on wave guide 301, thus electrically coupling array 312 with interconnect board 341. Additionally, it should be understood that bonding pad 348 is merely an example of one bonding pad of which there may be many. It should be further understood that bonding pad 348 typically is connected or coupled to electronic devices, such as individual electronic components, large scale integrated circuits (LSI), very large scale integrated circuits (VLSI), or the like.

By now it should be appreciated that a novel method for interconnecting an optical device to a waveguide has been described. The method allows for a precise alignment of a working portion of an optical device to a core region of a waveguide. Additionally, a highly manufacturable method and article have been described thus allowing for an inexpensive manufacturing of an optoelectronic mount.

We claim:

1. A method for electrically connecting an optical device and a waveguide together comprising the steps of:
   providing the waveguide with a first surface, a second surface, and an end;
   attaching a first metal tab to the first surface adjacent the end of the waveguide;
   attaching a second metal tab to the second surface substantially opposite to the first metal tab on the second surface;
   providing the optical device with a first contact and a second contact;
   positioning the optical device and the waveguide together, whereby the first contact and the second contact are proximal to the first metal tab and the second metal tab, respectively;
   attaching a first solder member in such a manner that the first solder member is proximal to the first contact of the optical device and the first metal tab and a second solder member in such a manner that the second solder member is proximal to the second contact of the optical device and the second metal tab of the waveguide; and
   reflowing the first and second solder member, thereby making electrical and mechanical contact from the first and second tab to the first and second contact.

2. A method as claimed in claim 1 wherein the step of providing the optical device is accomplished by providing a laser die.

3. A method as claimed in claim 2 wherein the step of reflowing is accomplished by thermally heating the first and second tab.

4. A method as claimed in claim 2 wherein the step of attaching of the first and second solder member is accomplished by robotic arm.

5. A method as claimed in claim 2 wherein the step of providing the laser die is accomplished by robotic control.

6. A method as claimed in claim 2 wherein the step of providing the waveguide is accomplished by providing a molded waveguide.

7. A method as claimed in claim 2 wherein the step of providing the laser die is accomplished by providing a vertical cavity surface emitting laser.

8. A method as claimed in claim 1 wherein the step of providing of the optical device is accomplished by providing a light emitting diode.

9. A method as claimed in claim 1 wherein the step of providing the optical device is accomplished by providing an optical device array.

10. A method as claimed in claim 1 wherein the step of providing the optical device is accomplished by providing a photodetector.

11. A method as claimed in claim 10 wherein the step of reflowing is accomplished by thermally heating the first and second tab.

12. A method as claimed in claim 10 wherein the step of attaching the first and second solder member is accomplished by robotic arm.

13. A method as claimed in claim 10 wherein the step of positioning the photodetector is accomplished by robotic control.

14. A method as claimed in claim 10 wherein the step of providing the waveguide is accomplished by providing a molded waveguide.

15. A method for electrically coupling an optical device to a waveguide comprising the steps of:
   providing an optical device having a first contact and a second contact;
   providing a molded waveguide with a first metal track on a first surface, a second metal track on a second surface, and an end; and
   making an electrical coupling from the first contact of the optical device to the first metal track of the molded waveguide and from the second contact of the optical device to the second metal track of the molded waveguide by reflowing a first and second bump ball positioned between the first and second contact and the first and second metal track, respectively.

16. A method as claimed in claim 15 wherein the step of reflowing the first and second bump ball is accomplished by thermal heating.

17. A method as claimed in claim 15 wherein the thermal heating is accomplished by a laser light.

18. A method for interconnecting an optical device and a molded waveguide together comprising:
   providing a molded waveguide with a first surface, a second surface, and an end;
   creating a first metal track on the first surface, wherein the first metal track is located at the end of the waveguide;
   creating a second metal track on the second surface, wherein the second metal track is located at the end and opposite the first metal track;
   providing the optical device with first and second contacts;
   positioning the end of the molded waveguide in such a manner that the first and second tracks of the molded waveguide form an angle of approximately ninety degrees with the first and second contacts of the laser;
   placing a first bump ball between the first contact and the first track and placing a second bump ball between the second contact and the second track; and
   reflowing the first and second bump ball, thereby interconnecting the laser and the molded waveguide.

19. A method as claimed in claim 18 wherein the step of reflowing the first bump ball and the second bump ball is accomplished by thermal heating.

20. A method as claimed in claim 19 wherein the thermal heating is accomplished by a laser light.

21. A method as claimed in claim 18 wherein the step of reflowing the first bump ball and the second bump ball is accomplished by acoustic heating.

22. A method as claimed in claim 18 wherein the step of providing the optical device is achieved by providing a vertical cavity surface emitting laser.

23. A method as claimed in claim 18 wherein the step of providing the optical device is achieved by providing a light emitting diode.

24. An optoelectronic mount comprising:
   an optic device with a first contact and a second contact;
   a molded waveguide with a first conductive track on a first surface, a second conductive track on a second surface, and an end; and
   means for interconnecting the first contact of the optic device to the first conductive track of the waveguide, and for interconnecting the second contact of the optic device to the second conductive track of the waveguide so that electrical coupling is achieved between the first and second contacts of the optic device and the first and second conductive tracks on the waveguide.

25. The optoelectronic mount of claim 24 wherein the optic device is a light transmitting device.

26. The optoelectronic mount of claim 24 wherein the optic device is a light receiving device.

27. The optoelectronic mount of claim 24 wherein the means for interconnecting the first contact of the optic device to the first conductive track of the waveguide and the second contact of the optic device to the second conductive track of the waveguide is achieve by reflowing a solder bump.

* * * * *